US008380555B2

(12) United States Patent
Kohler et al.

(10) Patent No.: US 8,380,555 B2
(45) Date of Patent: Feb. 19, 2013

(54) SYSTEM AND METHOD FOR IDENTIFYING AND MANAGING CUSTOMER NEEDS

(75) Inventors: Joylee E. Kohler, Northglenn, CO (US); Christian Long, Boulder, CO (US); Jeffrey J. Olson, Boulder, CO (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 946 days.

(21) Appl. No.: 12/270,443

(22) Filed: Nov. 13, 2008

(65) Prior Publication Data

US 2010/0121672 A1    May 13, 2010

(51) Int. Cl.
*G06Q 10/00* (2006.01)
(52) U.S. Cl. ..................................... 705/7.25
(58) Field of Classification Search ................... 705/7.25
See application file for complete search history.

(56) References Cited

U.S. PATENT DOCUMENTS 6,708,215 B1 *  3/2004  Hingorani et al. ............ 709/229
6,714,976 B1    3/2004  Wilson et al.
2002/0065864 A1 *  5/2002  Hartsell et al. ................ 709/100
2002/0124053 A1    9/2002  Adams et al.
2003/0126141 A1    7/2003  Hassman et al.
2007/0118433 A1    5/2007  Bess
2008/0005072 A1    1/2008  Meek et al.
2008/0062895 A1    3/2008  Chapman et al.
2008/0147722 A1    6/2008  Dolin et al.
2008/0215614 A1    9/2008  Slattery

FOREIGN PATENT DOCUMENTS

EP          1288795       8/2001

* cited by examiner

*Primary Examiner* — Romain Jeanty

(57) ABSTRACT

The system monitors the activity of customers, agents, and industry experts in a network for new topics relevant to a business and the interests in those topics. A determination is made automatically if there is enough interest to warrant adding a skill. If there is not enough interest, the system continues to monitor for topics and interests. If there is enough interest, the system automatically projects a resource needed for a skill. The system monitors internal resources and the network to determine if the resource needed for the skill exists in an internal resource. If the resource needed for the skill exists in an internal resource, the internal resource is reallocated. If the resource needed for the skill does exist in the internal resource, the system monitors the network for an external resource that has the skill.

34 Claims, 7 Drawing Sheets

SYSTEM AND METHOD FOR IDENTIFYING AND MANAGING CUSTOMER NEEDS

TECHNICAL FIELD

The system and method relate to managing customer service center resources, and in particular to managing customer service center resources by monitoring a network.

BACKGROUND

Currently, there are systems that can monitor a network for various things such as topics, interests, and the interaction between individuals in a social network. Some of these systems allow a user of a social network to identify and search on interests or topics. Some systems allow a user to find other people in the social network meeting search criteria. However, these systems do not identify potential skill needs in customer service center resources, do not search the network for needed skills in the customer service center, and do not change the customer service center based on potential needs. Furthermore, these systems are slow and manual, causing service providers to react and miss opportunities instead of being proactive and providing services before the competition.

SUMMARY

The system and method are directed to solving these and other problems and disadvantages of the prior art. The system monitors the activity of customers, agents, and industry experts in a network for new topics relevant to my business and the interests in those topics. A determination is made automatically if there is enough interest to warrant adding a skill. If there is not enough interest, the system continues to monitor for topics and interests. If there is enough interest, the system automatically projects a resource needed for a skill. The system monitors internal resources and the network to determine if the resource needed for the skill exists in an internal resource. If the resource needed for the skill exists in an internal resource, the skill is reallocated and agents are assigned. If the resource needed for the skill does exist in the internal resource, the system monitors the network for an external resource that has the skill.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1:
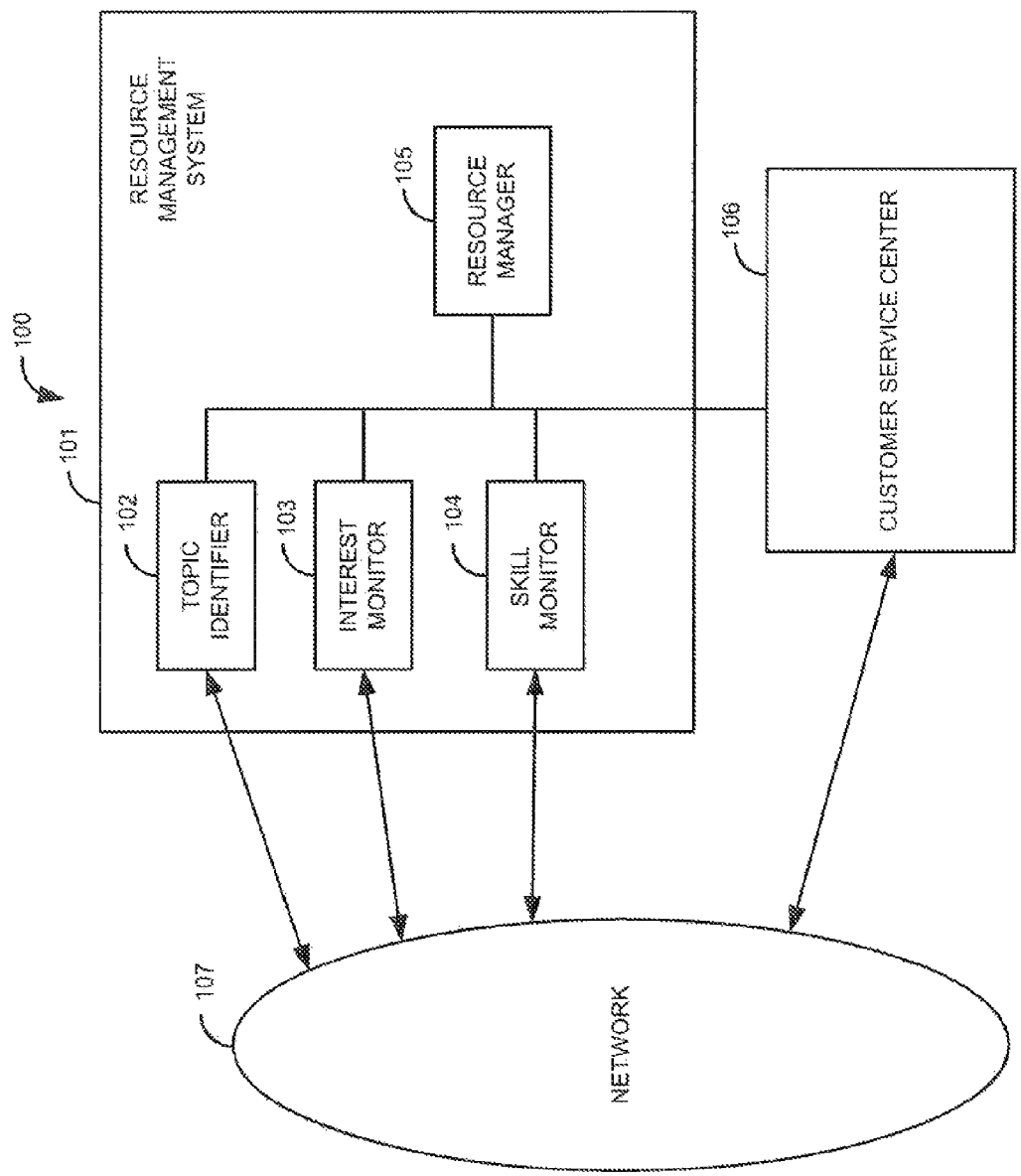
FIG. 1 is a block diagram of a first illustrative system for managing customer service center resources.

FIG. 1 is a block diagram illustrating a first illustrative system 100 for managing customer service center resources. The first illustrative system 100 comprises a resource management system 101, a customer service center 106, and a network 107. The resource management system 101 further comprises a topic identifier 102, an interest monitor 103, a skill monitor 104, and a resource manager 105.

The resource management system 101 could be any system capable of monitoring a network 107, such as a Private Branch Exchange (PBX), an Interactive Voice Response (IVR) system, a server, router, a gateway, and the like. The customer service center 106 could be any system capable of routing calls, such as a Session Initiation Protocol (SIP) proxy server, a PBX, a switch, a server, a router, and the like. The customer service center 106 can handle various types of customer interaction such as telephone calls, e-mails, chats, blogs, video conferences, and the like. The network 107 could be any type of network, such as the Internet, a computer network, a Local Area Network (LAN), a Wide Area Network (WAN), a telephone network, and the like. The network 107 could comprise various types of user networks and/or services, such as a social network, a chat room, a blog site, a job site, a customer network, a news network, a Real Simple Syndication (RSS) feed, a news feed, an online forum, an e-commerce rating, an e-commerce comment, an instant message, a social wall, a shared video, an audio file, an email, a Twitter, an online mobile device, a digital mode of interaction, and the like.

The topic identifier 102 starts with a list of known customers, agents, industry experts, and the like. The topic identifier 102 monitors the network 107 for their conversations, posts, activities, etc. The purpose of the topic identifier 102 is to discover new topics in the conversations that are related to the customer service center's business. A topic is typically a noun such as bicycle, telephone, car, and the like. However, a topic can be a quantitive measurement or why something happens. For example, a topic can be the number of friends that someone has, the number of is buddies in a buddy list, an event, and the like. Once identified, a new topic is passed to the interest monitor 103 which monitors the network 107 for interest. An interest can be a verb such as like, dislike, problem, disagree, and the like. An interest can be the increase and/or a decrease in conversations and/or activity about a topic and/or an interest. The resource manager 105 is configured to determine if there is enough interest to warrant adding the skill. The resource manager 105 determines if there is enough interest to warrant adding the skill based on rules.

For example, if customers start posting comments about the new XYZ telephone and the interest was "like" and "dislike" of the new XYZ telephone, the rule may be, if there are 100 occurrences of like and/or dislike in the same sentence as XYZ telephone on a particular web site, then there is enough interest to warrant adding the skill. As a second illustrative example, the interest could be an increase in the volume of conversation about a monitored topic. Based on a defined level of increase in the volume of conversation about the monitored topic, the resource manager 105 can determine if there is enough interest to warrant adding the skill. The interest monitor 103 also monitors the website for other potential interests/topics (next level of separation) that occur in the same sentences and/or paragraphs. For example, new fast dial feature, backlight, phone colors, and the like could be other interests/topics that may be detected in conjunction with the XYZ telephone.

If there is not enough interest (e.g., 100 occurrences) or increase in volume of interest, the interest monitor 103 continues to monitor the network 107 the interest. If there is enough interest, the resource manager 105 projects a resource need for a skill. The resource needed for a skill can be the number of agents need in the customer service center 106 to support the new XYZ telephone. The projection can be based on various rules such as the ratio of "like" and "dislike" in the same sentence or paragraph in relation to the new XYZ telephone. For example, if the ratio for like is 99% and 1% for dislike, the projection for additional agents to support sales of the new XYZ telephone would be much greater than if the ratio for "like" is 10% and 90% for "dislike."

The resource manager 105 determines if the resource needed for the skill exists in an internal resource. An internal resource can be any type of or combination of customer service center resources, such as one or more agents that handle calls, an IVR system, a group, a network, a customer resource, an application, a worker in a warehouse, a sales representative, and the like. Determining if the resource needed for the skill exists could be accomplished in various ways. For example, the resource manager 105 can scan profiles or resumes of agents to determine if any of the agents have any experience supporting the XYZ telephone. The resource manager 105 can also direct the skill monitor 104 to monitor the network 107 for an internal resource that has the skill.

If the resource needed for the skill exists in the internal resource, the skill is reallocated and agents are assigned. If the resource needed for the skill does not exist in the internal resource, the resource manager 105 directs the skill monitor 104 to monitor the network 107 for an external resource that has the skill. Monitoring for an external resource that has a skill can be accomplished by identifying individuals who are discussing the skill on a website, by searching resumes on a job site, and the like.

Figure 2:
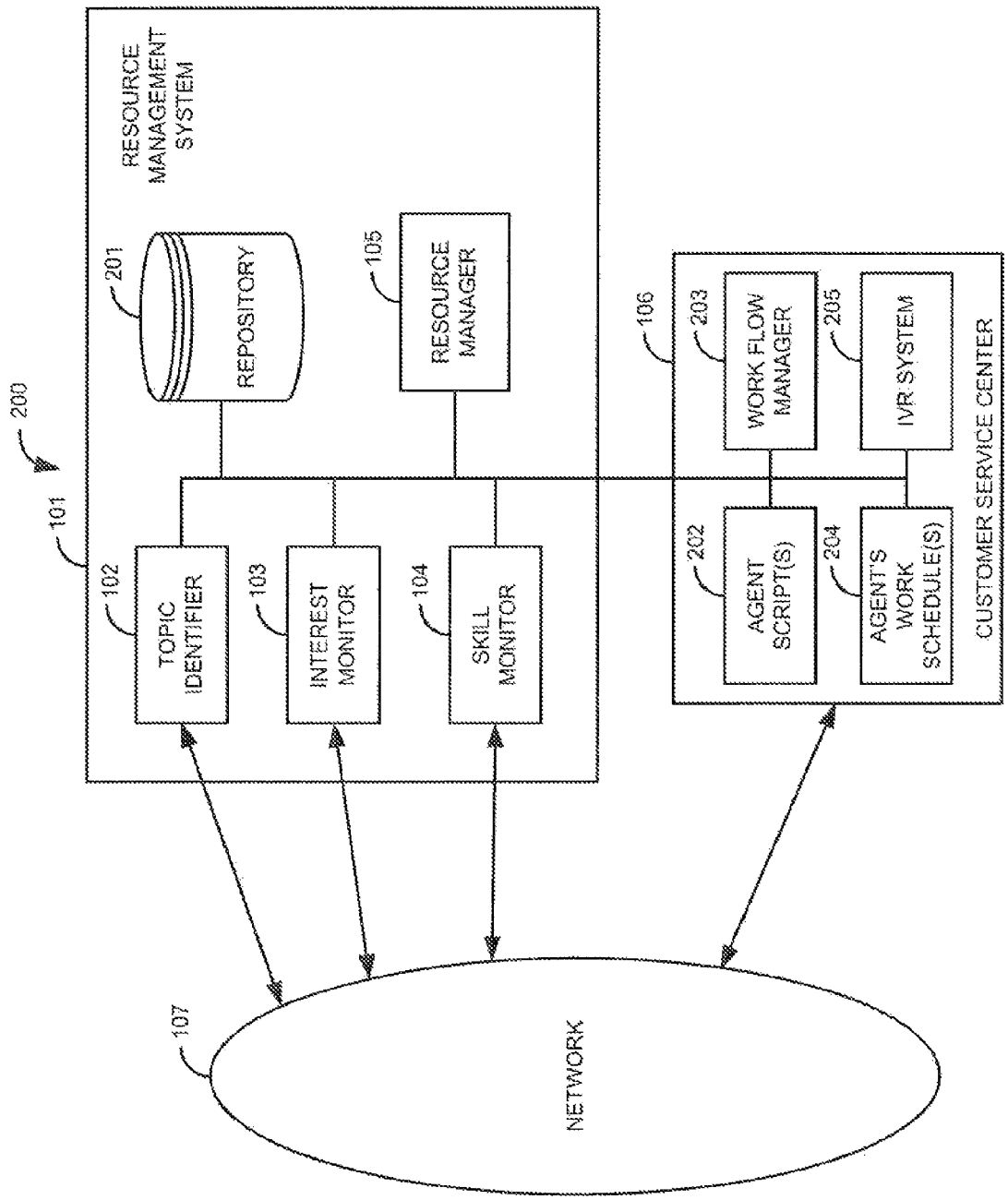
FIG. 2 is a block diagram of a second illustrative system for managing customer service center resources.

FIG. 2 is a block diagram illustrating a second illustrative system 200 for managing customer service center resources. The second illustrative system 200 comprises a resource management system 101, a customer service center 106, and a network 107. The resource management system 101 further comprises a topic identifier 102, an interest monitor 103, a skill monitor 104, a resource manager 105, and a repository 201. The customer service center 106 further comprises agent script(s) 202, a work flow manager 203, an agent's work schedule(s) 204, and an IVR system 205.

The repository 201 can be any type of device capable of storing information, such as a data base, a hard disk, a compact disk, and the like. The work flow manager 203 can be any system capable of directing the work flow in a customer service center 106 such as a PBX, an IVR system a router, a server, and the like. The IVR system 205 could be any system capable of providing interactive voice responses, such as a PBX, a switch, a server, and the like.

The topic identifier 102 monitors the network 107 for a topic. The interest monitor 103 monitors the network 107 for an interest. The resource manager 105 determines if there is enough interest to warrant adding the skill. The topic identifier 102 and the interest monitor 103 store the results from monitoring in the repository 201. The resource manager 105 determines if there is enough interest to warrant adding the skill based on rules. If there is not enough interest, the topic identifier 102 and the interest monitor 103 continue to monitor the network 107 for the topic and the interest. If there is enough interest to warrant adding the skill, the resource manager 105 projects a resource need for a skill.

The resource manager 105 determines if the resource needed for the skill exists in an internal resource. If the resource needed for the skill exists in the internal resource, the topic identifier 102 and the interest monitor 103 monitor the network 107 for the topic and the interest. If the resource needed for the skill does not exist in the internal resource, the resource manager 105 directs the skill monitor 104 to monitor the network 107 for an external resource that has the skill. The skill monitor 104 stores the results of the monitoring in the repository 201. At this point, a manager of the customer service center 106 can review the external resources and identity potential new agents to staff the customer service center 106.

The resource manager 105 notifies the work flow manager 203 in the customer service center 106 of the resource needed for the skill in the customer service center 106. The work-flow manager 203 generates an event and changes the call flow in the customer service center 106 by directing the IVR system 205 to change the call flow in the IVR system 205. The call flow is how a call gets routed in an IVR system. For example, the user may hit *2 in a first menu to get routed to technical support for bicycles and then hit *3 in a second menu to get routed to a particular type of bicycle. The call flow can be changed by adding a new menu option for support of a new bicycle (e.g., *4 on the second menu). The IVR system 205 can change the call flow for both inbound calls to the customer service center 106 and outbound for calls from the customer service center 106.

The work flow manager 203 can also change agent script(s) 202 based on the event. Agent scripts 202 are scripts that the agent reads when a customer is calling into the customer service center 106. Likewise, the work flow manager 203 can change the agent's work schedule 204 based on the event. In this example, the event is based on different call demand at different times. Other examples of events generated by the work flow manager are: ordering inventory, canceling inventory orders, scheduling agent training, and the like.

As an example that illustrates the second illustrative system 200 for managing customer service center resources, assume that Bike Inc. sells bicycles world-wide. Bike Inc. sells and supports a specialty bike (the Lazer) that it sells only in Europe. Bike Inc. supports the Lazer in a customer service center 106 in the United States. In Europe, the Tour de France has just been completed and the winner was riding the Lazer from Bike Inc. The topic identifier 102 is set up to monitor a blog site on the Internet 107 about the Tour de France for occurrences of the topic "Lazer." The interest monitor 103 is set up to monitor the same blog site for occurrences the interest of "buy." The results from the topic identifier 102 and the interest monitor 103 are stored in the repository 201. The resource manager 105 determines that there is enough interest between the topic (Lazer) and the interest (buy). The resource manager 105 has a rule that identifies a need for one additional agent (internal resources) per 1000 occurrences of the topic with the interest on the blog site on the Internet 107.

Based on 2000 occurrences of "Lazer" with "buy," the resource manager 105 projects a resource need of two additional agents for the skill (support for calls to buy the Lazer and language skill to support customers from Europe). The resource manager 105 determines if there are agents in the customer service center 106 that have experience with the Lazer and the appropriate language skills. The resource manager 105 determines that there are not any additional agents that have both Lazer expertise and the appropriate language skill in the customer service center 106. The resource manager 105 directs the skill monitor 104 to monitor a Bike Inc.'s U.S. blog site and a Job web site for individuals with knowledge of the Lazer with language skills. The skill monitor 104 identifies five potential individuals who have knowledge about the Lazer and the necessary language skills.

On the other hand, if the resource manager 105 determined that there are two agents in the internal resource (Antonio and Bob) with Lazer and language skills, the resource manager 105 directs the work flow manager 203 in the customer service center 106 to generate an event to change the call flow for inbound calls. The work flow manager 203 changes the inbound call flow in the IVR system 205 to route calls pertaining the Lazer to Antonio and Bob. The work flow manager 203 updates the agent script 202 for Antonio and Bob. Bob is currently supporting U.S. clients on another bike line. Since Bob will now be supporting customers in Europe, Bob's work schedule 204 is now changed to indicate that Bob will be working the night shift so he can support customers in Europe.

Figure 3:
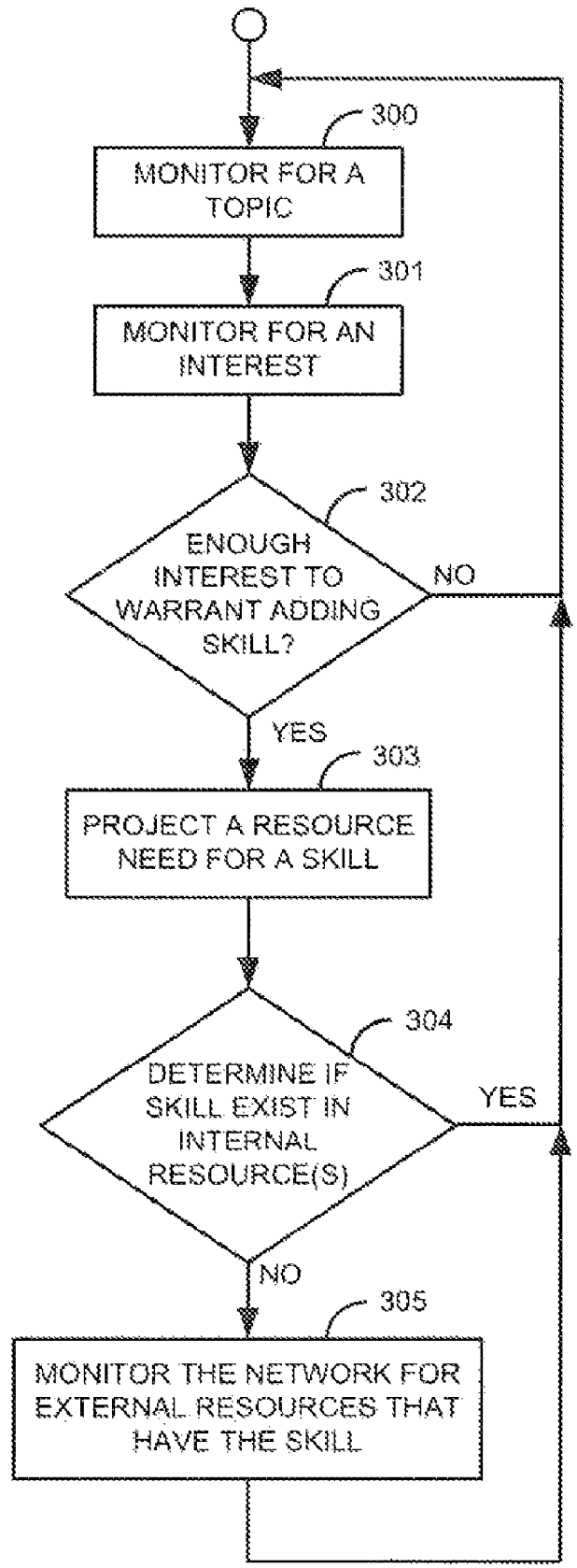
FIG. 3 is a flowchart of a method for managing customer service center resources.

FIG. 3 shows a method for managing customer service center resources. Illustratively, the topic identifier 102, the interest monitor 103, the skill monitor 104, the resource monitor 105, the work flow manager 203, and IVR system 205 are stored-program-controlled entities, such as a computer, which performs the method of FIGS. 3-7 by executing a program stored in a storage medium, such as a memory or disk.

The topic identifier 102 monitors 300 for a topic in the network 107. The topic identifier 102 can optionally store off the results into the repository 201. The results of the topic monitoring can be later used to identify secondary topics that are used to determine the next level of separation as described in FIG. 5. The interest monitor 103 monitors 301 the network 107 for an interest. The interest monitor 103 can optionally store off the results of the interest monitoring in the repository 201. The results of the interest monitoring can be later used to identify secondary topics that are used determine, the next level of separation (e.g. trends) as described in FIG. 5. The resource manager 105 determines 302 if there is enough interest from monitoring the topic and the interest to warrant adding a new skill. If there is not enough interest, the process goes to step 300. Otherwise, if there is enough interest in step 302, the resource manager 105 projects 303 a resource need for a skill. The resource manager 105 determines 364 if the skill exists in the internal resource(s). If the skill exists in the internal resource(s), the process goes to step 300.

Otherwise, the skill monitor 104 monitors 305 the network 107 for external resource(s) that have the skill. External resource(s) can be a person, a company, a group, a device, an organization, a static or dynamic group, a membership, a community, a network of friends, a software application, a business process, an entry point in a workflow, a script, a data source, a piece of content, and the like. An external resource is any resource that is not a part of the internal resources. After completing step 305, the process goes to step 300.

Figure 4:
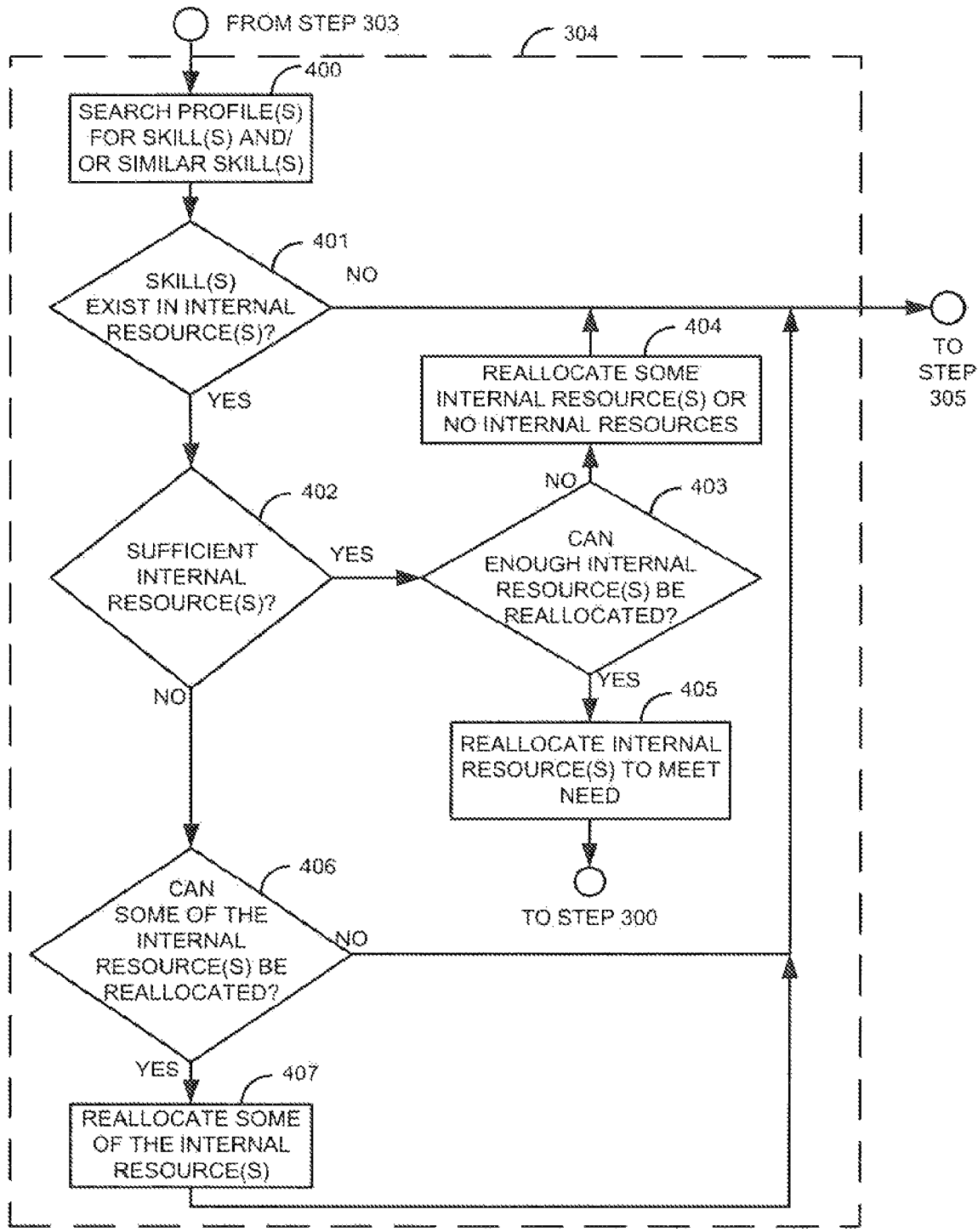
FIG. 4 is a flowchart of a method for determining how to allocate internal resources.

FIG. 4 shows a method for determining how to allocate internal resources. FIG. 4 is a detailed example of step 304 in FIG. 3. The resource manager 105 begins by searching 400 profile(s) for the skill(s). A profile could be, for example, an agent's resume. Another example of a profile could be a profile of a device such as an IVR system 205. The profile of the IVR system 205 can indicate the capacity (internal resource) of the IVR system 205 that allows the IVR system 205 to support additional agents that have the skill. In some instances, an IVR system 205 can support the skill through a series of call interaction steps with a caller. If the IVR system can support the skill, then the IVR system's profile can be used to until all or some of the resource needed for the skill. Searching 400 the profile can include searching for similar skills. For example, if an agent does not have experience supporting a specific type of bike, but has experience supporting other types of bikes, then the resource manager may determine 401 that the skill exists in the customer service center 106.

If the skill(s) do not exist in the customer service center 106 in step 401, the process goes to step 305. Otherwise, if the skill exists in the internal resource in step 401, the resource manager 105 determines 402 if there are sufficient internal resources. If there are sufficient internal resources in step 402, the resource manager 105 determines 403 if enough internal resources can be reallocated to meet the need for the skill. If enough internal resources can be reallocated 403, the resource manager 105 reallocates 405 enough internal resources to meet the need for the skill and goes to step 300. Otherwise, it enough internal resources cannot be reallocated in step 403, the resource manager 105 reallocates 404 some or no internal resources to meet the need for the skill and the process goes to step 305.

If there are not sufficient internal resources in step 402, the resource manager 105 determines 406 if some of the internal resources can be reallocated to meet the need for the skill. If some of the internal resources can be reallocated in step 406, the resource manager 105 reallocates 407 some of the internal resources and the process goes to step 305. Otherwise, if some of the internal resources cannot be reallocated in step 406, the process goes to step 305.

Figure 5:
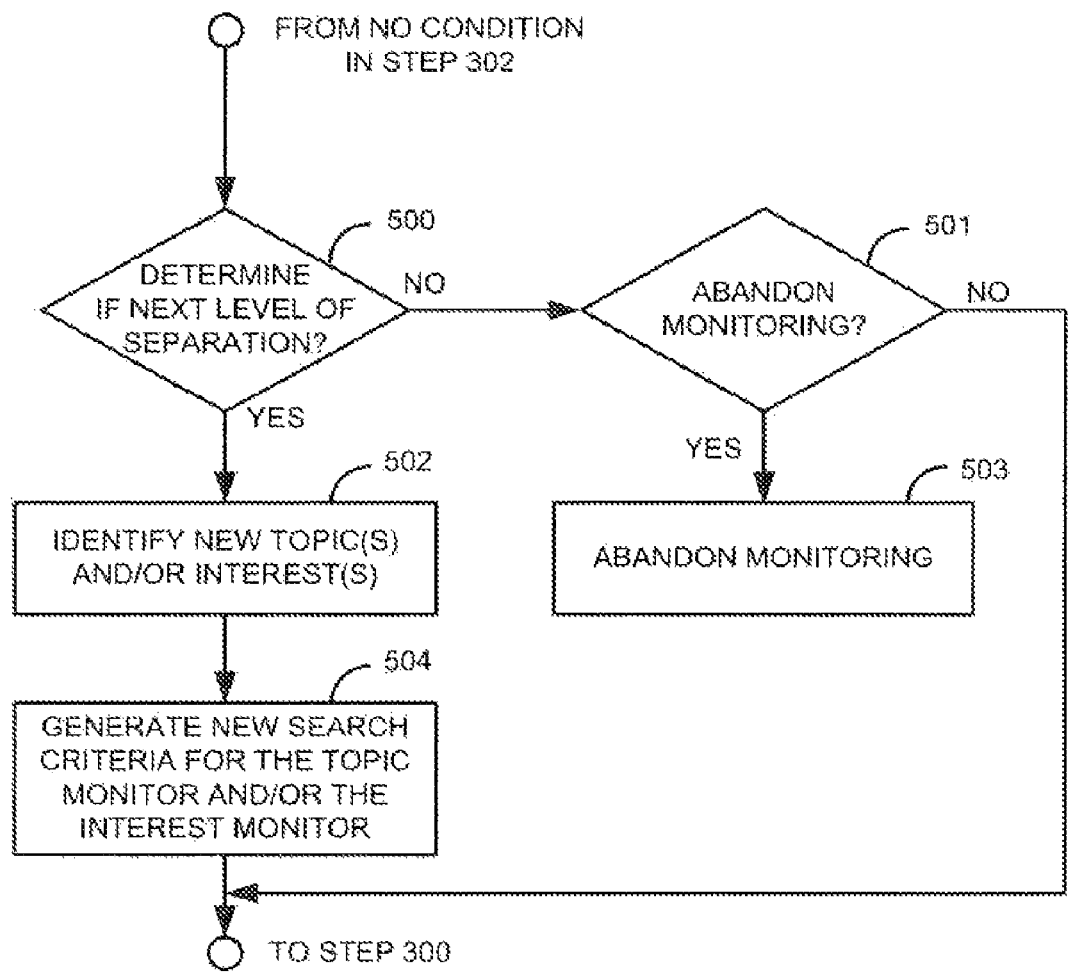
FIG. 5 is a flowchart of: a method for determining a next level of separation to identify a new topic or interest.

FIG. 5 shows a method for determining a next level of separation to identify a new topic or interest. The flow diagram in FIG. 5 is inserted between steps 302 and step 300 in FIG. 3. If there is not enough interest in step 302, the resource manager 105 determines 500 if it should go to the next level of separation. A next level of separation can be different/new secondary topics or interests that are captured and stored in the repository 201 by the topic identifier 102 and the interest monitor 103. There can be multiple levels of separation. As the topic identifier 102 and the interest monitor 103 monitor the network 107, the topic identifier and/or the interest monitor also monitor for topics and/or interests that do not have enough interest in step 302, but are at a next level of separation. For example, in the above example of using the topic of "Lazer" and "buy", the topic identifier 102 and the interest monitor 103 look for other terms and/or interests that are associated with Lazer and/or buy. In this example, the term "Lazer water holder" and "Flier" (a competitor's bike) are also talked about conjunction with "buy." The term "Lazer water holder" is a secondary topic with first level of separation because it is associated with the Lazer. The term "Flier" is a secondary topic with a second level of separation because it is not directly associated with the Lazer. There can be multiple levels of separation based on topic and interest monitoring. The terms/interests in the next level of separation are also determined by rules like the first level terms/interests.

If there is a next level of separation in step 500, the resource manager 105 identifies 502 a new topic(s) and/or interest(s). The resource manager 105 generates 504 new search criteria for the topic identifier 102 and/or the interest monitor 103. The process goes to step 300 and the new topic(s) and/or interests(s) are used by the topic identifier 102 and/or the interest monitor 103. It the resource manager 105 determines 500 that there is not a next level of separation, the resource manager 105 determines 501 whether to abandon 501 the monitoring by the topic identifier 102 and the interest monitor 103. If the resource manager 105 determines to abandon 501 the monitoring, the monitoring by the topic identifier 102 and the interest monitor 103 are abandoned 503. Otherwise, if the resource manager 105 determines to not abandon 501 the monitoring, the process goes to step 300.

Figure 6:
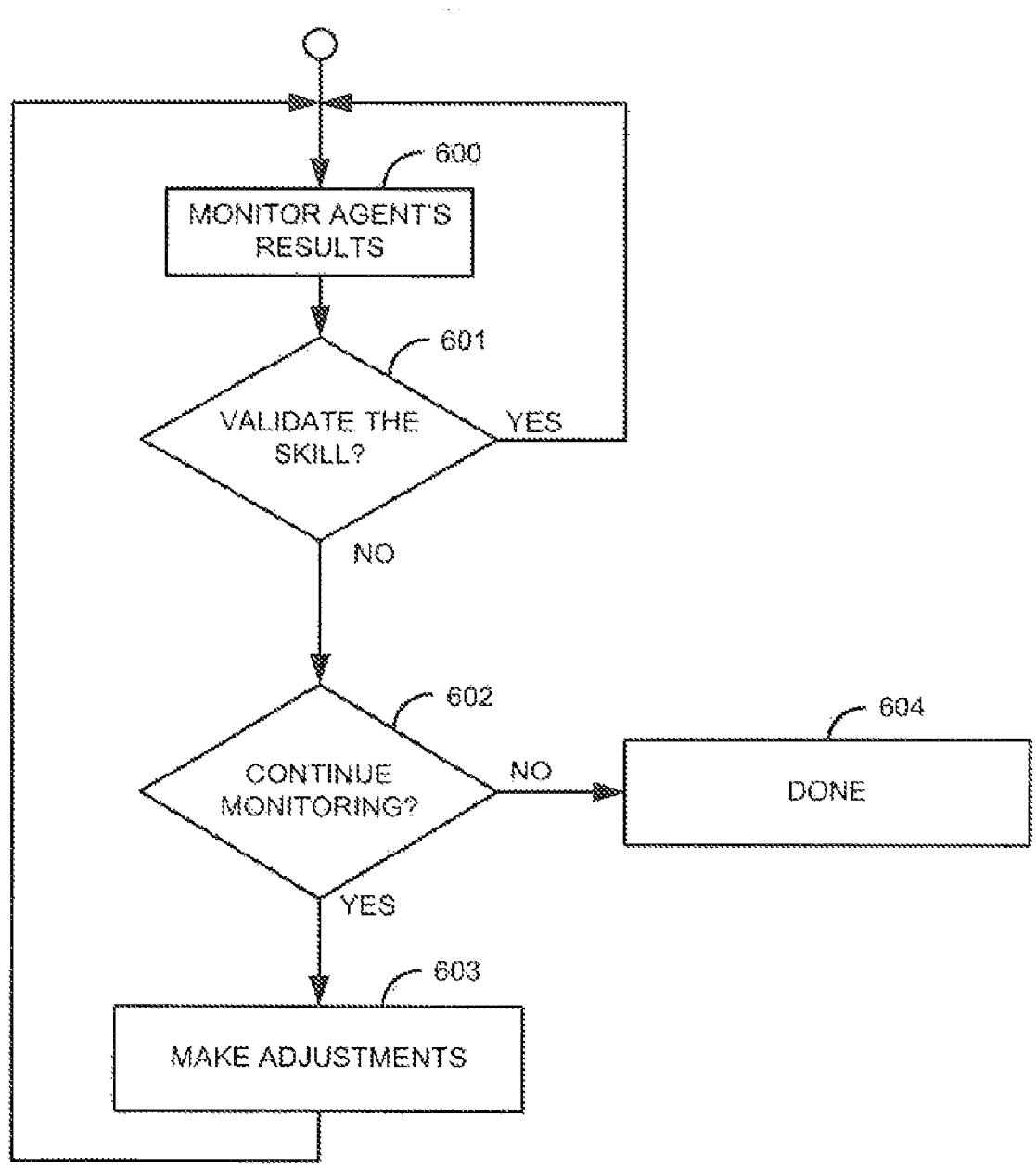
FIG. 6 is a flowchart of a method for monitoring an agent's results to validate a skill incorporated into an internal resource.

FIG. 6 shows a method for monitoring an agent's results to validate a skill incorporated into a customer service center 106. The work flow manager 203 monitors 600 the agent's results and validates whether 601 the skill which was incorporated into the customer service center 106 is meeting an actual need. The work flow manager 203 validates the skill by determining if the newly-allocated internal resources (see steps 404, 405, and 407) are being utilized correctly. For example, if after allocating internal resources, calls for the new skill have not increased, the work flow manager 203 would not validate the skill in step 601. If the number of calls increased in proportion to the newly-allocated internal resources, then the work flow manager 203 would validate the skill in step 601. If the skill is validated 601, the process goes to step 600.

Otherwise, if the skill is not validated in step 601, the work flow manager 203 determines 602 if it should continue to monitor the agent's results. If the work flow manager 203 wants to continue monitoring the agent's results, the work flow manager 203 makes 603 adjustments. Making adjustments can be, for example, to increase or reduce the number of agents supporting a product. Making adjustments can be retraining agents, updating agents' scripts 202, reallocating an agent, and the like. After the work flow manager 203 has made the adjustments in step 603, the process goes to step 600. If the work flow manager 203 determines 602 that the work flow manager 203 does not want to continue monitoring, the process is done 604.

Figure 7:
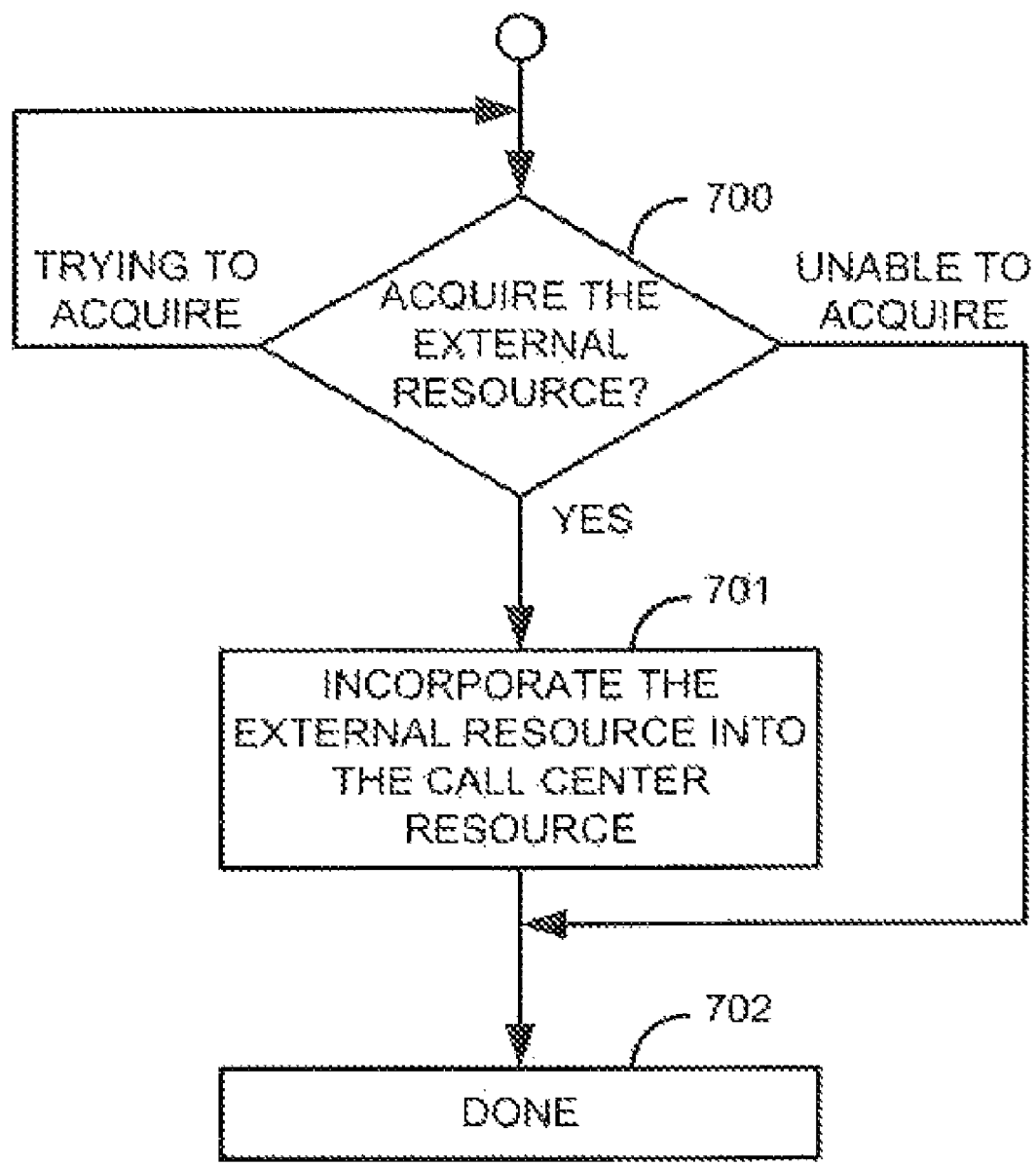
FIG. 7 is a flowchart of a method for acquiring an external resource and incorporating the external resource into an internal resource.

FIG. 7 shows a method for acquiring an external resource and incorporating the external resource into the internal resource. The process begins after the skill monitor 104 has monitored the network 107 in step 305 and identified external resources that have the skill. The external resource could be an individual who has knowledge about the skill, a company that has expertise in the skill, and the like. The resource manager 105 attempts 700 to acquire the external resource. For example, hiring a person or company that the skill monitor 104 has identified in step 305 would be a way of acquiring an external resource.

If the resource manager 105 has not acquired the external resource in step 700, the process repeats. It the resource manager 105 acquires the external resource in step 700, the resource manager 105 incorporates 701 the external resource into an internal resource and is done 702. Examples of incorporating 702 an external resource into the internal resource could be adding an agent, adding a company to support the skill, and the like. Otherwise, if the resource manager 105 is unable to acquire the external resource in step 700, the process is done 702.

Of course, various changes and modifications to the illustrative embodiment described above will be apparent to those skilled in the art. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A system for managing a customer service center resource comprising:
   a resource management system comprising hardware processing circuitry for the following components:
   a. a topic identifier configured to monitor a network for a topic;
   b. an interest monitor configured to monitor the network for an interest;
   c. a skill monitor configured to monitor the network for an internal or external resource that has a skill; and
   d. a resource manager configured to determine if there is enough interest to warrant adding the skill, to project a resource needed for the skill in response to determining that there is enough interest to warrant adding the skill, to determine if the resource needed for the skill exists in an internal resource, and to direct the skill monitor to monitor the network for the external resource that has the skill in response to the resource needed for the skill not existing in the internal resource.

2. The system of claim 1, wherein the internal or external resource is at least one item selected from the group comprising: a person, a company, a group, an organization, a customer, a static or dynamic group, a membership, a community, a network of friends, a software application, a business process, an entry point in a workflow, a script, a data source, a piece of content, and a device.

3. The system of claim 1, wherein the resource manager is configured to acquire the external resource and incorporate the external resource into the internal resource.

4. The system of claim 1, wherein the resource manager is configured to identify the internal resource and reallocate the internal resource.

5. The system of claim 1, wherein monitoring the network for the topic or the interest is accomplished by monitoring at least one item from the group comprising: network communications, network conversations, classifications, clusters, communication flow, sentiment, context roles, and community shifts.

6. The system of claim 1, wherein the resource manager is configured to determine if the skill exists in a profile, reallocating at least some of the internal resource and monitoring the network for an external resource that has the skill in response the skill existing in the profile, and monitoring the network for the external resource that has the skill in response to the skill not existing in the profile.

7. The system, of claim 6, wherein the profile is at least one item selected from the group comprising: a profile for a person, a profile for company, a profile for a group, a profile for an organization, a profile for a customer, a profile for a static or dynamic group, a profile for a membership, a profile for a community, a profile for a network of friends, a profile for a software application, a profile for a business process, a profile for an entry point in a workflow, a profile for a script, a profile for data source, a profile for a piece of content, a profile for a device, a profile for an agent, and a profile for an IVR system.

8. The system of claim 6, wherein the resource manager is configured to determine if a similar skill exists in the profile.

9. The system of claim 6, wherein the resource manager is configured to generate an event in the customer service center.

10. The system of claim 9, wherein the event is at least one item selected from 2 the group comprising: changing a call flow, changing an inbound call flow, changing an outbound call flow, changing the call flow in an IVR system, changing an agent's script, changing an agent's work schedule, ordering inventory, canceling inventory orders, scheduling agent training, adding subject matter experts, changing routing rules, changing menu choices, changing website elements, redirecting messaging, changing email templates, generating a call, changing a digital signage, and changing a posted video.

11. The system of claim 1, wherein the resource manager is configured to determine if a search of a next level of separation is required, to identify at least one new topic or at least one new interest in response to determining that the search for the next level of separation is required, and to abandon the monitoring for the topic and the interest in response to determining that the search of the next level of separation is not required.

12. The system of claim 1, wherein the topic identifier, the network monitor, or the skill monitor are configured to monitor at least one item selected from the group comprising: a web site, a chat room, a social network, a customer network, a news feed, an RSS feed, a job website, a blog site, an online forum, e-commerce ratings, e-commerce comments, an instant message, a social wall, a shared video, an audio file, an email thread, a Twitter stream, an online mobile device, and a digital mode of interaction.

13. The system of claim 1, further comprising: a work flow manager configured to monitor an agent's results for the skill and to validate the skill.

14. The system of claim 1, wherein the interest monitor is configured to monitor the network by monitoring at least one item selected from the group comprising: an increase in conversations about a topic, a decrease in conversations about a topic, an increase in conversations about a secondary topic, and a decrease in conservations about a secondary topic.

15. The system of claim 1, wherein the interest monitor is configured to monitor the network by comparing occurrences of the topic in relation to occurrences of the interest.

16. A method for managing a customer service center resource comprising:
   a resource management system comprising hardware processing circuitry for performing the following steps:
   a. monitoring a network for a topic;
   b. monitoring the network for an interest;
   c. determining if there is enough interest to warrant adding a skill;
   d. responsive to there being enough interest to warrant adding the skill, projecting a resource need for the skill;
   e. determining if the resource needed for the skill exists in an internal resource; and
   f. responsive to the resource needed for the skill not existing in the internal resource, monitoring the network for an external resource that has the skill.

17. The method of claim 16, wherein the external resource is at least one item selected from the group comprising: a person, a company, a group, an organization, a customer, a static or dynamic group, a membership, a community, a network of friends, a software application, a business process, an entry point in a workflow, a script, a data source, a piece of content, and a device.

18. The method of claim 16, further comprising the step of: acquiring the external resource and incorporating the external resource into the internal resource.

19. The system of claim 16, further comprising the step of identifying the internal resource and reallocating the internal resource.

20. The system of claim 16, wherein monitoring the network for the topic or the interest further comprises the step of: monitoring at least one item from the group comprising: network communications, network conversations, classifications, clusters, communication flow, sentiment, context roles, and community shifts.

21. The method of claim 16, wherein the step of determining if the resource needed for the skill exists in the internal resource further comprises the steps of:
   g. determining if the skill exists in a profile;
   h. responsive to the skill existing in the profile, reallocating at least some of the internal resource and going to step (f); and
   i. responsive to the skill not existing in the profile going to step (f).

22. The method of claim 21, wherein the profile is at least one item selected 2 from the group comprising: a profile for a person, a profile for company, a profile for a group, a profile for an organization, a profile for a customer, a profile for a static or dynamic group, a profile for a membership, a profile for a community, a profile for a network of friends, a profile for a software application, a profile for a business process, a profile for an entry point in a workflow, a profile for a script, a profile for data source, a profile for a piece of content, a profile for a device, a profile for an agent, and a profile for an IVR system.

23. The method of claim 21, wherein determining if the skill exists in the profile further comprises the step of: determining if a similar skill exists in the profile.

24. The method of claim 21, wherein the step of reallocating at least some of the internal resource further comprises the step of: generating an event in the customer service center.

25. The method of claim 24, wherein the event is at least one item selected from the group comprising: changing a call flow, changing an inbound call flow, changing an outbound call flow, changing the call flow in an IVR system, changing an agent's script, changing an agent's work schedule, ordering inventory, canceling inventory orders, scheduling agent training, adding subject matter experts, changing routing rules, changing menu choices, changing website elements, redirecting messaging, changing email templates, generating a call, changing a digital signage, and changing a posted video.

26. The method of claim 16, wherein the response to absence of enough interest to warrant adding the skill, further comprises the steps of:
   g. determining if a search of a next level of separation is required;
   h. responsive to determining that the search of the next level of separation is required, identifying at least one new topic or at least one new interest and going to step (a); and
   i. responsive to determining that the search of the next level of separation is not required, abandoning the monitoring for the topic and the interest.

27. The method of claim 16, wherein monitoring the network for the topic, monitoring the network for the interest, or monitoring the network for the external resource is accomplished by monitoring at least one item selected from the group comprising: a web site, a chat room, a social network, a customer network, a news feed, an RSS feed, a job website, a blog site, an online forums, an a-commerce ratings, an e-commerce comment, an instant message, a-social wall, a shared video, an audio file, an email, a Twitter stream, an online mobile device, and a digital mode of interaction.

28. The method of claim 16, further comprising the steps of: monitoring an agent's results for the skill and validating the skill.

29. The method of claim 16, wherein monitoring the network for the interest further comprises the step of: monitoring the network for at least one item selected from the group comprising: an increase in conversations about a topic, a decrease in conversations about a topic, an increase in conversations about a secondary topic, and a decrease in conservations about a secondary topic.

30. The method of claim 16, wherein monitoring the network for the interest
   further comprises the step of: monitoring the network by comparing occurrences of the topic in relation to occurrences of the interest.

31. A resource management system comprising hardware processing circuitry for performing the method of one of claims 16-30.

32. An apparatus for managing a customer service center resource, comprising:
- hardware processing circuitry means for operating a resource management system, wherein the hardware processing circuitry means comprise:
  a. means for monitoring a network for a topic;
  b. means for monitoring the network for an interest;
  c. means for determining if there is enough interest to warrant adding a skill;
  d. means, responsive to there being enough interest to warrant adding the skill, projecting a resource needed for the skill;
  e. means for determining if the resource needed for the skill exist in an internal resource; and
  f. means, responsive to the resource needed for the skill not existing in the internal resource, monitoring the network for an external resource that has the skill.

33. A system for managing a customer service center resource comprising:
- a resource management system comprising hardware processing circuitry for the following components:
  a. a topic identifier configured to monitor a network for a topic;
  b. an interest monitor configured to monitor the network for an interest;
  c. a skill monitor configured to monitor the network for an external resource that has a skill;
  d. a resource manager configured to determine if there is enough interest to warrant adding the skill, to direct the topic identifier to monitor the network for atopic in response to determining that there is not enough interest to warrant adding the skill, to project a resource need for the skill in response to determining that there is enough interest to warrant adding the skill, to determine if the resource needed for the skill exists in an internal resource, to direct the topic identifier to monitor the network for a topic in response to the resource needed for the skill existing in the internal resource, and to direct the skill monitor to monitor the network for the external resource that has the skill in response to the resource needed for the skill not existing in the internal resource, to determine if the skill exists in a profile, to reallocate at least some of the internal resource and monitor the network for the external resource that has the skill in response to the skill existing in the profile, and to monitor the network for the external resource that has the skill in response to the skill not existing in the profile; and
  e. a resource manager configured to change a call flow of an IVR system in the customer service center, to change an agent's script, and to change an agent's work schedule.

34. A method for managing a customer service center resource comprising:
- a resource management system comprising hardware processing circuitry for performing the following steps:
  a. monitoring a network for a topic;
  b. monitoring the network for an interest;
  c. determining if there is enough interest to warrant adding a skill;
  d. responsive to absence of enough interest to warrant adding the skill, going to step (a);
  e. responsive to enough interest to warrant adding the skill, projecting a resource need for the skill;
  f. determining if the resource needed for the skill exist in an internal resource;
  g. responsive to the resource needed for the skill existing in the internal resource, going to step (i);
  h. responsive to the resource needed for the skill not existing in the internal resource, monitoring the network for an external resource that has the skill and going to step (a);
  i. determining if the skill exists in a profile;
  j. responsive to the skill existing in the profile, reallocating at least some of the internal resource and going to step (l);
  k. responsive to the skill not existing in the profile going to step (h);
  l. changing the call flow of an IVA system;
  m. changing an agent's script; and
  n. changing agent's work schedule and going to step (a).

* * * * *